(12) United States Patent
Kakihara

(10) Patent No.: US 10,237,360 B2
(45) Date of Patent: *Mar. 19, 2019

(54) COMMUNICATION SYSTEM, SERVER APPARATUS, AND COMMUNICATION METHOD

(71) Applicant: Sony Corporation, Tokyo (JP)

(72) Inventor: Yoshiyuki Kakihara, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,789

(22) Filed: Jul. 18, 2017

(65) Prior Publication Data

US 2017/0318101 A1 Nov. 2, 2017

Related U.S. Application Data

(63) Continuation of application No. 15/042,539, filed on Feb. 12, 2016, now Pat. No. 9,729,646, which is a continuation of application No. 13/693,258, filed on Dec. 4, 2012, now Pat. No. 9,294,535.

(30) Foreign Application Priority Data

Dec. 27, 2011 (JP) ................ 2011-285727

(51) Int. Cl.
*G06F 15/16* (2006.01)
*H04L 29/08* (2006.01)
*H04W 4/02* (2018.01)
*H04W 4/04* (2009.01)

(52) U.S. Cl.
CPC .............. *H04L 67/18* (2013.01); *H04L 67/00* (2013.01); *H04W 4/023* (2013.01); *H04W 4/027* (2013.01); *H04W 4/046* (2013.01)

(58) Field of Classification Search
CPC H04L 29/08072; H04L 29/06; H04L 29/0809
USPC .......................................................... 709/217
See application file for complete search history.

(56) References Cited

U.S. PATENT DOCUMENTS

| 9,294,535 B2 * | 3/2016 | Kakihara ................ H04L 67/00 |
| 9,729,646 B2 * | 8/2017 | Kakihara ................ H04L 67/00 |
| 2007/0118661 A1 | 5/2007 | Fishwanathan et al. |

(Continued)

OTHER PUBLICATIONS

Office Acton issue in Japanese Application No. 201210557131.0, dated Feb. 6, 2017. With English translation (22 pages).

*Primary Examiner* — Alan S Chou
(74) *Attorney, Agent, or Firm* — Oblon, McClelland, Maier & Neustadt, L.L.P.

(57) ABSTRACT

Disclosed herein is a communication system including: a first apparatus and a second apparatus being communication terminals at least one of which resides on a mobile object; and a server apparatus. The server apparatus includes: a determination block configured to determine whether the first and the second apparatuses are in close proximity to each other based on position data of the first apparatus and on position data of the second apparatus; and a communication block configured such that if the determination block determines that the first and the second apparatuses are in close proximity to each other, the communication block transmits preinstalled content data to at least one of the first and the second apparatuses.

8 Claims, 6 Drawing Sheets

(56) References Cited

U.S. PATENT DOCUMENTS

2011/0300840 A1 12/2011 Basir
2012/0042044 A1 2/2012 Vishwanathan et al.

* cited by examiner

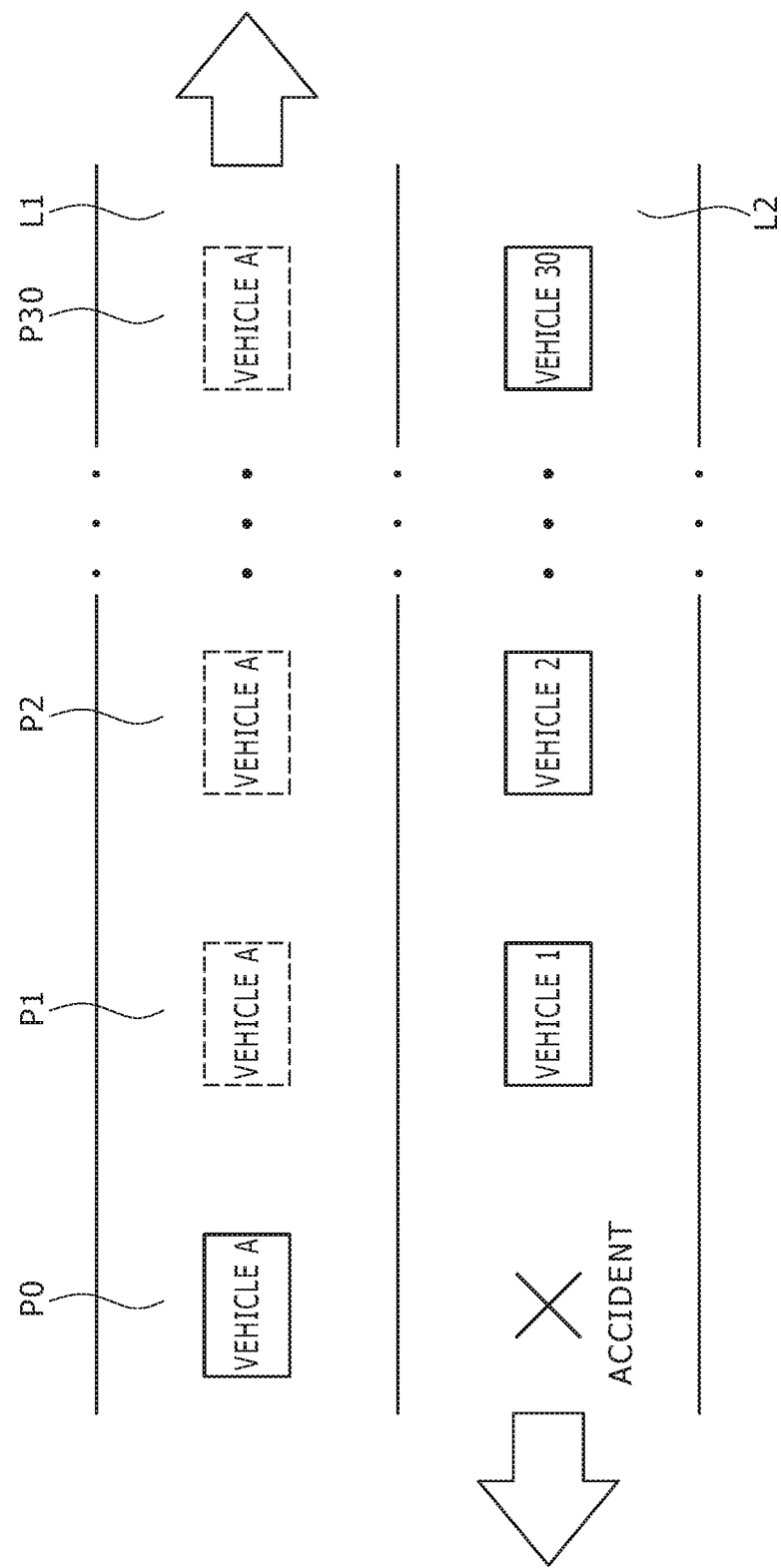

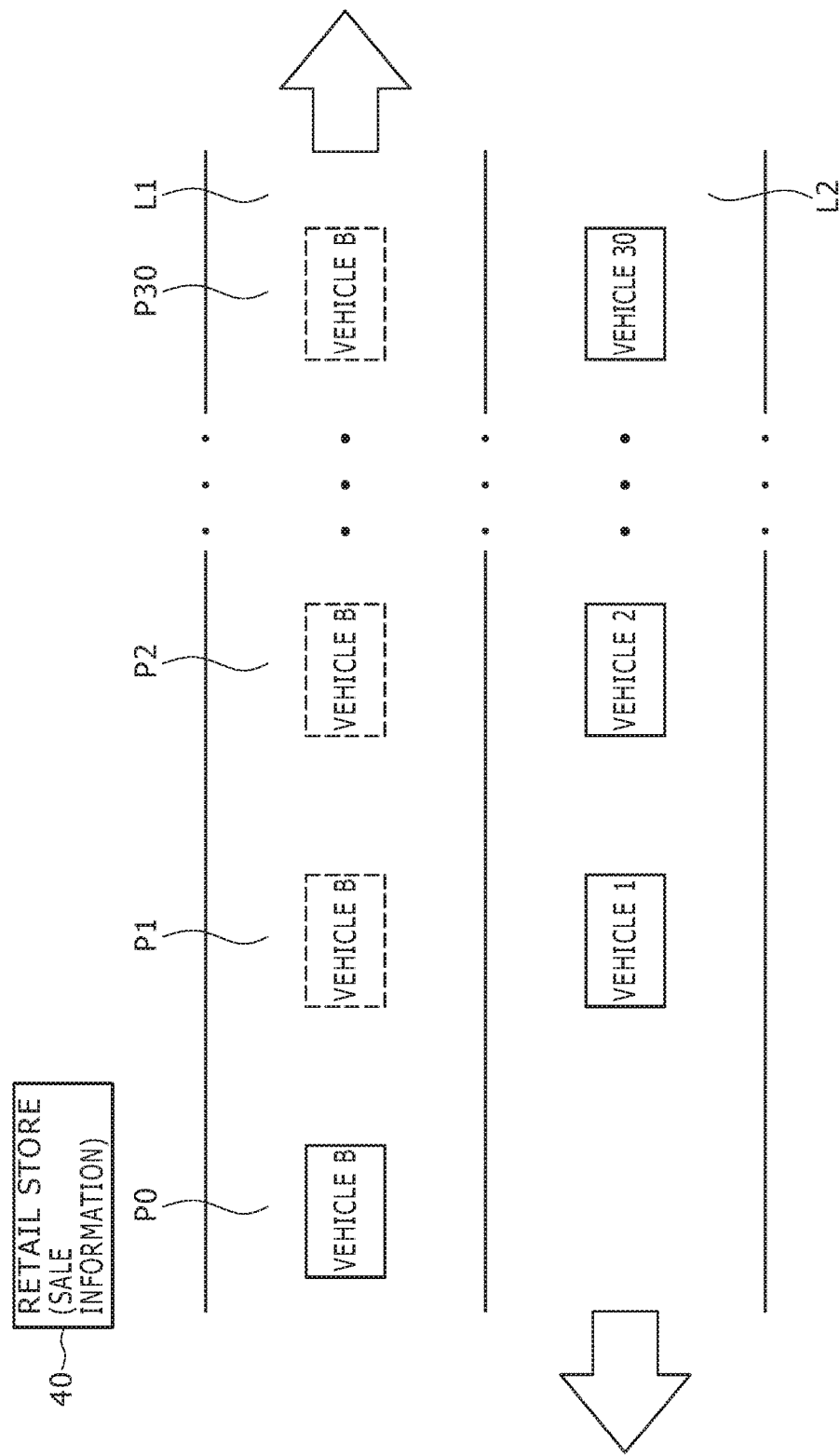

COMMUNICATION SYSTEM, SERVER APPARATUS, AND COMMUNICATION METHOD

This application is a continuation of application Ser. No. 15/042,539, filed on Feb. 12, 2016, which is a continuation application of U.S. application Ser. No. 13/693,258, filed Dec. 4, 2012, which is in turn based upon and claims the benefit of priority from Japanese Patent Application No. 2011-285727, filed on Dec. 27, 2011, the entire contents of all of which are incorporated herein by reference.

BACKGROUND

The present disclosure relates to a communication system, a server apparatus, and a communication method adapted to use a mobile terminal that resides in a mobile object, for example.

There have been proposed systems that transmit and receive diverse data using mobile terminals. For example, Japanese Patent Laid-open No. 2002-163200 (called Patent Document 1 hereunder) discloses a system that allows mobile phones to access a server to download data stored in that server. As another example, Japanese Patent Laid-open No. 2009-105928 (called Patent Document 2 hereunder) discloses a communication system that allows terminals in close proximity to exchange data therebetween.

SUMMARY

One disadvantage of the technology described in Patent Document 1 is that a user must perform operations to access the server. One disadvantage of the technology discussed in Patent Document 2 is that when the terminals stay in close proximity to each other only for a short period of time, the data exchanges therebetween may not be completed in time.

The present disclosure has been made in view of the above circumstances and it is desirable to provide a communication system, a server apparatus, and a communication method whereby data is transmitted unfailingly to a mobile terminal close to a predetermined apparatus.

According to one embodiment of the present disclosure, there is provided a communication system including: a first apparatus and a second apparatus being communication terminals at least one of which resides on a mobile object; and a server apparatus. The server apparatus includes: a determination block configured to determine whether the first and the second apparatuses are in close proximity to each other based on position data of the first apparatus and on position data of the second apparatus; and a communication block configured such that if the determination block determines that the first and the second apparatuses are in close proximity to each other, the communication block transmits preinstalled content data to at least one of the first and the second apparatuses.

According to another embodiment, there is provided a server apparatus including: a determination block configured to determine whether a first apparatus and a second apparatus are in close proximity to each other based on position data of the first apparatus and on position data of the second apparatus; and a communication block configured such that if the determination block determines that the first and the second apparatuses are in close proximity to each other, the communication block transmits preinstalled content data to at least one of the first and the second apparatuses.

According to a further embodiment, there is provided a communication method, in a communication system, including: determining whether a first apparatus and a second apparatus are in close proximity to each other based on position data of the first apparatus and on position data of the second apparatus; and if it is determined that the first and the second apparatuses are in close proximity to each other, then transmitting content data preinstalled in a server apparatus to at least one of the first and the second apparatuses.

According to at least one of the above-outlined embodiments of this disclosure, it is possible to transmit data unfailingly to a communication terminal in close proximity to a predetermined apparatus.

BRIEF DESCRIPTION OF THE DRAWINGS

Further objects and advantages of the present disclosure will become apparent upon a reading of the following description and appended drawings in which:

FIG. 6 is a schematic view explaining an application example of this disclosure; and FIG. 7 is a schematic view explaining another application example of this disclosure.

DETAILED DESCRIPTION OF THE PREFERRED EMBODIMENTS

Some preferred embodiments of the present disclosure will now be described below by reference to the accompanying drawings. The description will be given under following headings:

<1. Embodiments>
<2. Applications>
<3. Variations>

It should be noted that the embodiments, applications and variations to be discussed below are merely preferable examples and are not limitative of the present disclosure.

1. Embodiments

[Communication System]

Figure 1:
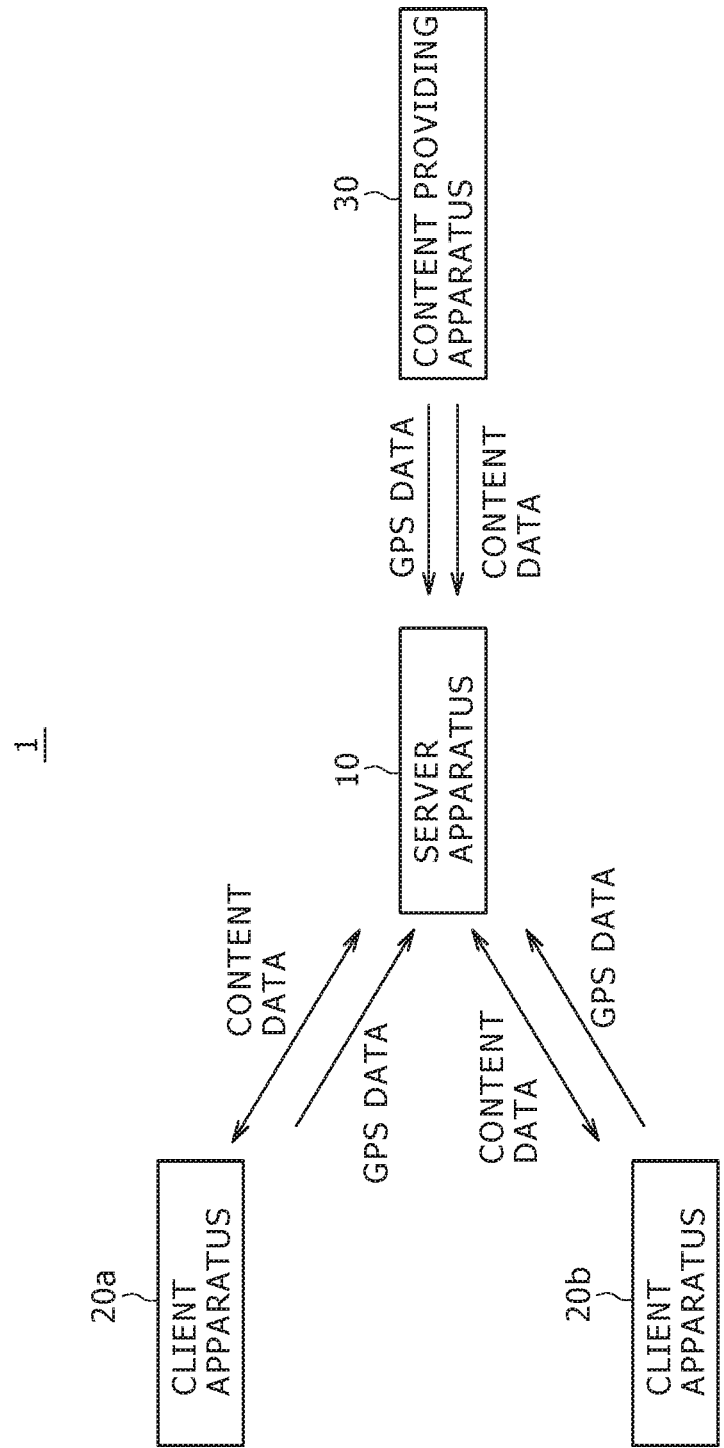
FIG. 1 is a block diagram showing a typical communication system.

FIG. 1 shows a typical configuration of a communication system embodying this disclosure. A communication system 1 in FIG. 1 includes a server apparatus 10 and a plurality of client apparatuses 20 that can be connected to the server apparatus 10. Whereas the client apparatuses 20a and 20b are shown in FIG. 1 as representative of the client apparatuses 20, other client apparatuses may be connected to the server apparatus 10 as well. In the ensuing description where there is no need to distinguish the individual client apparatuses from one another, they may be generically referred to as the client apparatus 20.

The server apparatus 10 stores content data. The content data may include music data, image data such as still images and moving images, text data, and combinations of these types of data. The text data may be data that represents short sentences (e.g., tweets) and URLs (Uniform Resource Locators). The server apparatus 10 transmits the content data to the client apparatus 20 via a network.

The content data to be stored in the server apparatus 10 may be transmitted from a content providing apparatus 30 for example. The content providing apparatus 30 may be a personal computer for example. Alternatively, the client apparatus 20*a* and/or 20*b* may transmit the content data to the server apparatus 10. A user of the client apparatus 20 may be the same as, or different from, a user of the content providing apparatus 30.

At least one of the client apparatuses 20*a* and 20*b* is a communication terminal that resides on a mobile object. The mobile object in this context may be a bicycle, a vehicle, a train or the like that moves at a relatively higher speed than the walking human. The terminal that resides on the mobile object may be a mobile terminal carried by an individual on board the mobile object, a communication apparatus mounted on the mobile object, or a mobile terminal attached to a predetermined position of the mobile object. The communication terminal need not be incorporated within the mobile object. For example, part or all of the communication terminal may be attached to and exposed from the body of the mobile object. As another example, part or all of the communication terminal may appear outside the mobile object when the terminal is being used.

The client apparatus 20 transmits its identification data as well as GPS (Global Positioning System) data including its position information to the server apparatus 10. The identification data and GPS data thus transmitted are received by the server apparatus 10. The GPS data may include data about the speed at which the client apparatus 20 is moving and directional data about the direction in which the client apparatus 20 is traveling. The speed data and the directional data may be calculated by the server apparatus 10.

The client apparatus 20 receives the content data transmitted from the server apparatus 10. Alternatively, the client apparatus 20 may upload the content data to the server apparatus 10.

[Typical Structure of the Server Apparatus]

Figure 2:
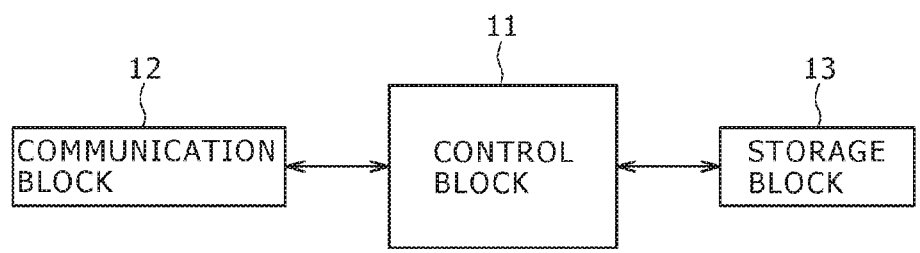
FIG. 2 is a block diagram showing a typical structure of a server apparatus.

FIG. 2 shows a typical structure of the server apparatus 10. The server apparatus 10 may include a control block 11, a communication block 12, and a storage block 13 for example. The control block 11 may typically have a CPU (Central Processing Unit) that controls the components of the server apparatus 10. The control block 11 includes a ROM (Read Only Memory) that stores predetermined programs and a RAM (Random Access Memory) used to temporarily store work areas and data during program execution.

The control block 11 determines whether the client apparatuses 20*a* and 20*b* are in close proximity to each other by referencing, say, the GPS data from the client apparatuses 20*a* and 20*b*.

The control block 11 may identify the speed at which the client apparatus 20 is moving and the direction in which the client apparatus 20 is traveling. For example, the control block 11 may identify the speed and the traveling direction of the client apparatus 20*a* by monitoring changes in the position of the client apparatus 20*a*. Likewise, the control block 11 may identify the speed and the traveling direction of the client apparatus 20*b* by monitoring changes in the position of the client apparatus 20*b*. The control block 11 may then determine whether the client apparatuses 20*a* and 20*b* pass each other by referencing the information about their positions and their moving directions.

The communication block 12 is an interface used by the server apparatus 10 to communicate with the client apparatus 20 and content providing apparatus 30. Using the communication block 12, the server apparatus 10 communicates with the client apparatus 20 under a predetermined protocol (e.g., HTTP (Hypertext Transfer Protocol)). For example, the content data may be transmitted from the server apparatus 10 to the client apparatus 20 through the communication block 12. Also, GPS data and content data may be received via the communication block 12.

The storage block 13 may include a hard disk for example, and stores the content data provided by the client apparatus 20 and content providing apparatus 30. The content data may be transmitted by the client apparatuses 20*a* and 20*b*, for example. The content data may also be provided by the content providing apparatus 30. The storage block 13 may be a semiconductor memory or the like but should preferably have a large capacity.

The content data is stored in association with identification data. The identification data includes IDs (identifiers) each assigned to each of the client apparatuses and also an ID assigned to each user. Referencing the identification data can identify the client apparatus or the user that uploaded the content data of interest. Alternatively, the content data may be associated with other data. For example, data about a party to which given content data is disclosed may be associated with the content data in question.

The storage block 13 may be an independent server apparatus. That is, the server apparatus 10 of the communication system 1 may have a server apparatus that has the control block 11 and another server apparatus that has the storage block 13. The server apparatus having the control block 11 may communicate with the server apparatus having the storage block 13 to exchange content data therebetween. In other words, the server apparatus according to the embodiment of this disclosure is not limited to a single server apparatus arrangement and embraces a setup of a plurality of server apparatuses carrying out server functions on a distributed basis.

[Typical Performance of the Server Apparatus]

Typical performance of the server apparatus 10 is explained below. The server apparatus 10 gets the communication block 12 to receive GPS data and identification data sent from the client apparatus 20*a*. The server apparatus 10 also uses the communication block 12 to receive GPS data and identification data transmitted from the client apparatus 20*b*. For example, the GPS data and identification data may be transmitted automatically and periodically (e.g., at intervals of 30 seconds) from the client apparatuses.

The GPS data and identification data received by the communication block 12 are fed to the control block 11. By referencing the GPS data and identification data, the control block 11 determines the positions of the client apparatuses 20*a* and 20*b*. The control block 11 then determines whether the client apparatuses 20*a* and 20*b* are in close proximity to each other. For example, it is determined whether the client apparatuses 20*a* and 20*b* are within 100 meters of each other. Obviously, the proximate distance of 100 meters is only an example and may be changed as needed.

Upon determining that the client apparatuses 20*a* and 20*b* are in close proximity to each other, the control block 11 performs a search process. The search process involves searching the identification data stored in the storage block 13 for any content data that may have been provided by the client apparatus 20*a* or 20*b*. If there is no content data provided by the client apparatus 20*a* or 20*b*, the process is terminated.

If it is determined that there exists the content data provided by the client apparatus 20*a* or 20*b*, the control block 11 performs a process of offering the content data. For example, suppose that the storage block 13 stores content data "a" provided by the client apparatus 20a. In that case, upon determining that the client apparatuses 20a and 20b are in close proximity to each other, the control block 11 reads the content data "a" from the storage block 13 and transmits the retrieved data "a" to the client apparatus 20b through the communication block 12. The content data "a" is then received and reproduced by the client apparatus 20b.

As another example, suppose that the storage block 13 stores content data "a" provided by the client apparatus 20a and content data "b" provided by the client apparatus 20b. In this case, upon determining that the client apparatuses 20a and 20b are in close proximity to each other, the control block 11 reads the content data "a" and content data "b" from the storage block 13.

The control block 11 then transmits the retrieved content data "a" to the client apparatus 20b via the communication block 12. The content data "a" is then received and reproduced by the client apparatus 20b. Also, the control block 11 transmits the retrieved content data "b" to the client apparatus 20a through the communication block 12. The content data "b" is then received and reproduced by the client apparatus 20a.

In the manner explained above, at least one of the client apparatuses in close proximity to each other can be supplied with the content data provided by the other client apparatus. There is no need for the user of any client apparatus to perform operations to obtain the content data.

The control block 11 of the server apparatus 10 may determine whether the client apparatuses 20a and 20b have crossed each other. In this context, the expression "crossing each other" means that the client apparatuses 20a and 20b gradually approach each other, are in the closest distance to each other at a certain point in time, and then distance themselves gradually from each other. The closest distance may be a few meters or less, for example. By monitoring changes in the positions of the client apparatuses 20a and 20b, the control block 11 can determine whether the client apparatuses 20a and 20b have crossed each other.

Upon determining that the client apparatuses 20a and 20b have crossed each other, the control block 11 transmits the content data to at least one of the client apparatuses 20a and 20b as explained above. The timing for transmitting the content data is typically just when the client apparatuses 20a and 20b cross each other. Because the server apparatus 10 transmits the content data, the data can be sent unfailingly even if the client apparatuses 20a and 20b cross each other in a very short time.

Alternatively, the timing for transmitting the content data may be asynchronous with the timing of the client apparatuses 20a and 20b crossing each other. For example, the content data may be transmitted from the server apparatus 10 upon elapse of a predetermined time period after the client apparatuses 20a and 20b have crossed each other. The time period may be a few minutes long, or may be determined as desired. Because the server apparatus 10 transmits the content data, it is possible to change as needed the timing for sending the content data in reference to just when the client apparatuses cross each other.

[Client Apparatuses]

Figure 3:
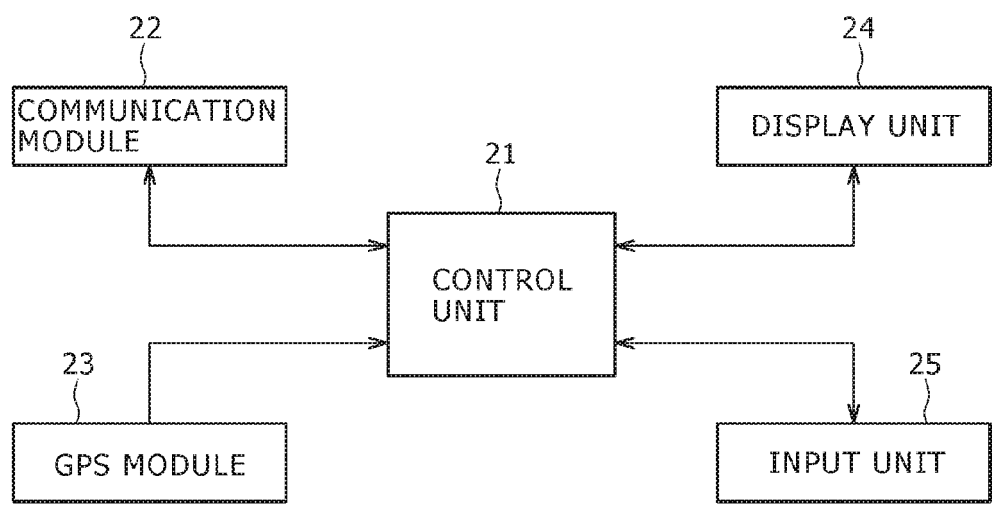
FIG. 3 is a block diagram showing a typical structure of a client apparatus.

FIG. 3 shows a typical structure of the client apparatus 20. For example, the client apparatus 20 may include a control unit 21, a communication module 22, a GPS module 23, a display unit 24, and an input unit 25.

The control block 21 may have a CPU for example, and controls the components of the client apparatus 20. The control block 21 includes a ROM that stores predetermined programs and a RAM used to temporarily store work areas and data during program execution.

The communication module 22 receives the content data transmitted from the server apparatus 10 for example. Also, the communication module 22 transmits GPS data and identification data to the server apparatus 10. The GPS module 23 acquires position information about the client apparatus 20 before generating the GPS data indicative of where the client apparatus 20 is positioned. The GPS data may include speed data and directional data about the client apparatus 20 following the calculation of the speed at which the client apparatus 20 is moving and the direction in which the client apparatus 20 is traveling.

The GPS data thus generated is fed to the communication module 22 under control of the control unit 21. The GPS data and the identification data from the client apparatus 20 are supplied to the server apparatus 10 via the communication module 22.

The display unit 24 includes a display panel such as an LCD (Liquid Crystal Display) panel or an organic EL (Electroluminescence) panel and a driver adapted to drive that display panel. The display unit 24 displays the content data transmitted from the server apparatus 10 for example. The display unit 24 may also display other information such as a menu screen adapted to operate the client apparatus 20.

The input unit 25 may include buttons, switches, dial keys and the like, furnished on the client apparatus 20. Alternatively, the display unit 24 may be a touch panel offering the function of the input unit 25.

The above-described structure of the client apparatus 20 is only an example and may be modified as needed. For example, the client apparatus 20 may provide imaging and telephone capabilities. The client apparatus 20 may be equipped with a speaker audibly reproducing content data.

The individual client apparatuses 20 may or may not have the same structure. For example, the structure of the client apparatus 20a may be different from that of the client apparatus 20b.

[Typical Performance of the Client Apparatuses]

The client apparatus 20 transmits its GPS data to the server apparatus 10. The GPS data may be generated in an appropriate format based on the position information acquired by the GPS module 23, for example. The GPS data thus generated is supplied to the control unit 21. The control unit 21 supplements the supplied GPS data with identification data and forwards both the GPS data and the identification data to the communication module 22. The communication module 22 transmits the GPS data and identification data to the server apparatus 10. The GPS data and identification data from the client apparatus 20 are fed to the server apparatus 10 periodically (e.g., at intervals of 30 seconds).

The client apparatus 20 receives the content data sent from the server apparatus 10. The content data transmitted from the server apparatus 10 may be received by the communication module 22, for example. The content data received by the communication module 22 is supplied to the control unit 21. The control unit 21 performs such processes as demodulation and error correction on the content data. The content data thus processed is sent to the display unit 24. Given the content data, the display unit 24 may display captions, images, etc. The content data may also be reproduced audibly.

Notification may be given by display or by sound indicating that the content data has been transmitted from the server apparatus 10. The user of the client apparatus 20 may then select whether or not to reproduce the content data.

The client apparatus 20 may be used to upload content data to the server apparatus 10. For example, the user of the client apparatus 20 may input text explaining how the user feels about his or her favorite food, by use of the input unit 25. Text data corresponding to the input text is then fed to the control unit 21. The control unit 21 supplements the text data with identification data, and forwards both the text data and the identification data to the communication module 22. The communication module 22 uploads the text data and identification data to the server apparatus 10.

The content data that may be uploaded is not limited to text data. For example, image data obtained by the client apparatus 20 may be uploaded as content data. A combination of image data and text data may also be uploaded as content data. As another example, the client apparatus 20 may include a storage unit adapted to store the content data provided by other apparatuses. The content data thus stored in the storage unit may then be uploaded to the server apparatus 10.

The structure and performance of the content providing apparatus 30 may approximately be the same as the structure and performance of the above-described client apparatus 20, for example.

[Typical Upload Process]

Figure 4:
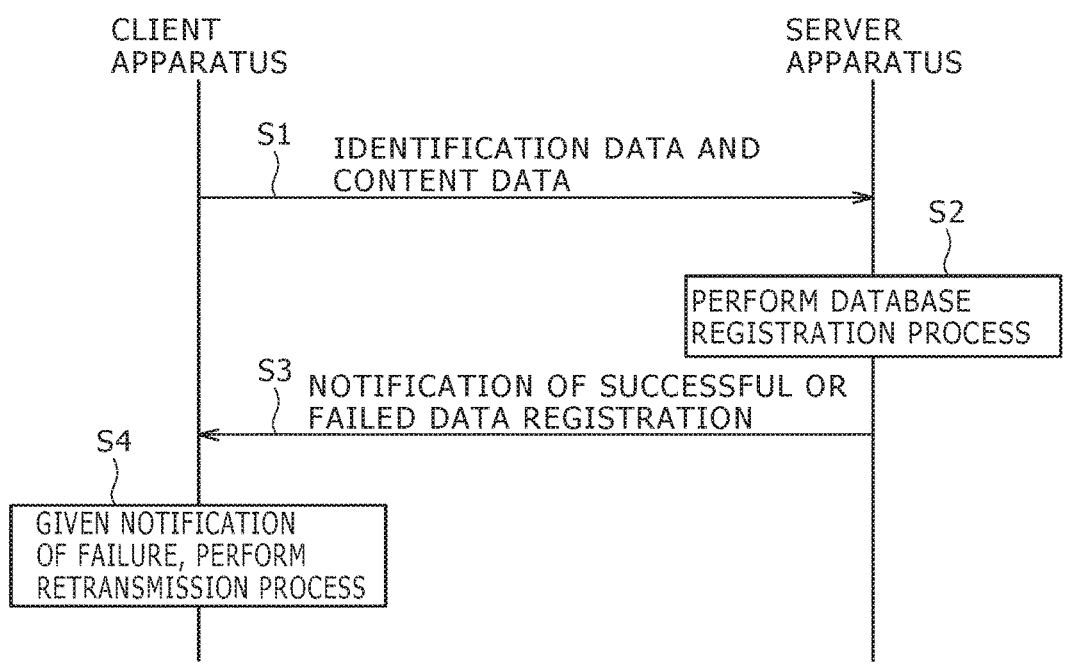
FIG. 4 is a sequence chart explaining a typical flow of an upload process.

FIG. 4 shows a typical flow of the upload process in which content data is uploaded to the server apparatus. The example of FIG. 4 is one in which the client apparatus 20 uploads content data to the server apparatus 10. The processing on the side of the server apparatus 10 is carried out under control of the control block 11, for example. The processing on the side of the client apparatus 20 is performed under control of the control unit 21, for example.

First, the client apparatus 20 transmits identification data and content data (step S1). The transmitted identification data and content data are received by the server apparatus 10. The server apparatus 10 stores the received identification data and content data into the storage block 13 that serves as a typical database (step S2).

Next, the server apparatus 10 transmits to the client apparatus 20 a notification of whether or not the identification data and content data have been successfully registered (step S3). If the notification from the server apparatus 10 announces a failed registration, the client apparatus 20 retransmits the identification data and content data to the server apparatus 10. If the notification of a successful registration is not received after the identification data and content data have been transmitted a predetermined number of times, the display unit 24 of the client apparatus 20 may display an error indication.

The content data may be classified into such categories as "traffic information," "sales information," "gourmet information," "weather information," and "disaster information" when stored. Furthermore, solely the previously registered client apparatuses and content providing apparatuses may be allowed to perform the process of uploading content data.

In the same manner described above, the content providing apparatus 30 may upload content data to the server apparatus 10.

[Content Data Transmission Process]

Figure 5:
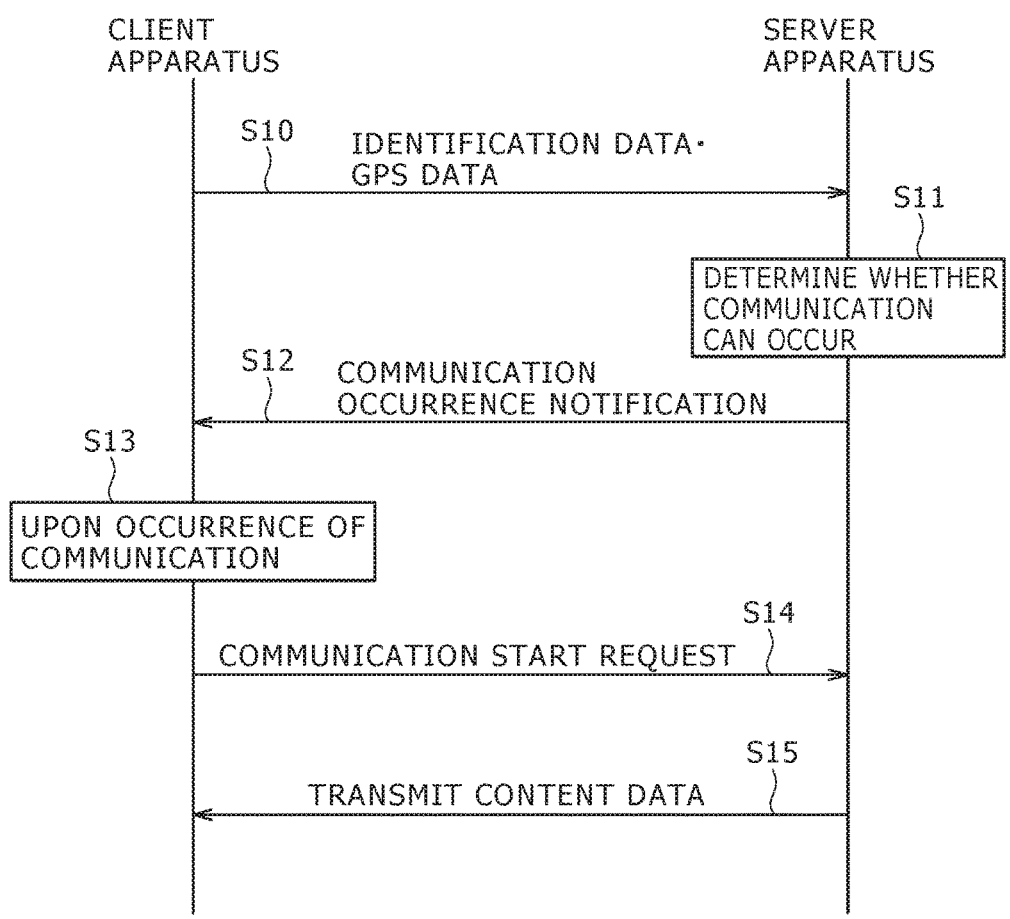
FIG. 5 is a sequence chart explaining a typical flow of a content transmission process.

FIG. 5 shows a typical flow of the process of transmitting content data. The processing on the side of the server apparatus 10 is carried out under control of the control block 11, for example. The processing on the side of the client apparatus 20 is performed under control of the control unit 21, for example. The example of FIG. 5 is one in which the content data uploaded beforehand by the client apparatus 20b (the data will be called the content data P hereunder where appropriate) is stored in the server apparatus 10. In this example, the content data P is transmitted to the client apparatus 20a.

The client apparatus 20 transmits its identification data and GPS data to the server apparatus 10 (step S10). For example, the client apparatus 20a may transmit to the server apparatus 10 the identification data identifying the client apparatus 20a and the GPS data representing the position information about the client apparatus 20a. Also, the client apparatus 20b may transmit to the server apparatus 10 the identification data identifying the client apparatus 20b and the GPS data representative of the position information about the client apparatus 20b.

By referencing the identification data and GPS data, the server apparatus 10 acquires the positions of the client apparatuses 20a and 20b. The server apparatus 10 then determines whether the client apparatuses 20a and 20b are in close proximity to each other.

Upon this determination, the server apparatus 10 determines whether or not communication can take place between the client apparatuses 20a and 20b (step S11). In this process of communication occurrence determination, if the client apparatuses 20a and 20b are found in close proximity to each other, then the server apparatus 10 determines that communication can occur therebetween. If the client apparatuses 20a and 20b are not found in close proximity to each other, the server apparatus 10 determines that communication does not take place therebetween.

The server apparatus 10 transmits the result of the communication occurrence determination to the client apparatus 20a (step S12). Upon receipt of a notification that communication does not occur, the client apparatus 20a waits for the next notification to be transmitted.

Upon determining in step S11 that communication can occur, the server apparatus 10 transmits a communication occurrence notification to the client apparatus 20a. At this point, the communication occurrence notification may include a communication ID identifying the communication to take place and the amount of the content data P scheduled to be transmitted by the server apparatus 10.

The client apparatus 20a receives the communication occurrence notification indicating that communication can occur (step S13). The client apparatus 20a then requests the server apparatus 10 to start the communication (step S14). At this point, the communication start request may include a communication ID and the amount of data that can be received by the client apparatus 20a in one go.

In response to the communication start request, the server apparatus 10 transmits the content data P to the client apparatus 20a (step S15). If the amount of the content data P is too large to be transmitted in one go, the content data P may be divided into portions before being transmitted.

As explained above, upon determination that the client apparatuses 20a and 20b are in close proximity to each other, the content data uploaded previously by the client apparatus 20b may be transmitted to the client apparatus 20a. In like manner, the content data uploaded beforehand by the client apparatus 20a may be transmitted to the client apparatus 20b. Even if the communication occurrence notification is received in step S13, the client apparatus 20a may choose to refuse continuation of the communication and thus not to download the content data.

The client apparatus 20 may select a desired category of content data so that only the content data of the selected category will be transmitted from the server apparatus 10. With the content data category thus selected, even if there are many kinds of content data, only the content data that fits in the category desired by the user will be transmitted from the server apparatus 10.

2. Applications

A number of applications of this disclosure will now be explained. It should be noted that these applications are not limitative of the present disclosure.

[First Application]

Suppose that as shown in FIG. 6, vehicles travel in opposite lanes L1 and L2, that vehicle A travels in the lane L1, and that a person on board the vehicle A possesses a mobile terminal serving as the client apparatus 20a. In view of traffic safety, the person in possession of the mobile terminal should not be the driver of the vehicle. Alternatively, the client apparatus 20a may be mounted on board the vehicle A. The mobile terminal is moved in keeping with the vehicle A traveling in the lane.

For example, the user of the client apparatus 20a then witnesses a traffic accident that took place near a position P0 in the lane L2. At this point, the user uploads text data "A traffic accident occurred near position P0" to the server apparatus 10 by use of the client apparatus 20a. The vehicle A travels from there to position P1, to position P2, . . . , along the lane L1. While the vehicle A is traveling, the GPS data and identification data of the client apparatus 20a are transmitted periodically to the server apparatus 10. The server apparatus 10 acquires the GPS data and identification data from the client apparatus 20a.

At a position P30 a few kilometers from the position P0 for example, the vehicle A crosses a vehicle 30 traveling in the line L2. A passenger on board the vehicle 30 possesses a mobile terminal corresponding to the client apparatus 20b. The GPS data and identification data of the client apparatus 20b are transmitted periodically to the server apparatus 10.

By referencing the identification data and GPS data, the server apparatus 10 determines whether or not the client apparatuses 20a and 20b have crossed each other. At this point, the server apparatus 10 determines that the client apparatuses 20a and 20b have crossed each other near the position P30. The server apparatus 10 then supplies the client apparatus 20b with the text data uploaded from the client apparatus 20a. The client apparatus 20b receives the text data thus supplied.

The client apparatus 20b then reproduces the text data. For example, the display unit of the client apparatus 20b may display the text "A traffic accident occurred near position P0." Instead of, or along with, the display, the text data may be audibly reproduced. When the text data is reproduced, a driver of the vehicle 30 can recognize that a traffic accident has occurred ahead near the position P0. In such a case, the driver of the vehicle 30 may select a road different from the lane L2 so as to bypass a road block or a traffic jam that may result from the accident.

The text data may be transmitted in a manner asynchronous with the timing of the vehicles A and 30 crossing each other. That is, there is no need for the vehicles A and 30 to be in close proximity to each other when the text data is reproduced.

The vehicles A and 30 cross each other in a very short time. In a peer-to-peer direct communication between the client apparatuses 20a and 20b, it may be difficult to complete the transmission and reception of content data therebetween in such a short time period. According to the embodiment of this disclosure, by contrast, the server apparatus 10 transmits content data in a manner asynchronous with the timing of the vehicles crossing each other. This makes it possible unfailingly to transmit the content data to each of the client apparatuses in close proximity to each other.

The users of the client apparatuses can acquire traffic information without performing operations such as those for selecting a website that offers traffic information. Where the client apparatus 20b is mounted on each of vehicles 1, 2, etc., the client apparatus 20b may each be supplied with text data.

[Second Application]

A second application of this disclosure will now be explained. Suppose that as shown in FIG. 7, a retail store 40 is located along the lane L1. The retail store 40 is furnished with a personal computer as a typical content providing apparatus 30. The personal computer uploads content data to the server apparatus 10. The content data may be sale information about the retail store 40 for example. At this point, the sale information is uploaded to the server apparatus 10 along with identification data "AA0" for example. The server apparatus 10 stores the sale information about the retail store 40 in association with the identification data "AA0."

A salesperson of the retail store 40 carrying the client apparatus 20a gets on board a vehicle B. In this case, the client apparatus 20a may be set in such a manner that the GPS data of the client apparatus 20a is transmitted to the server apparatus 10 together with the identification data "AA0." After the setting, the vehicle B starts traveling in the lane L1.

The vehicle B traveling in the lane L1 crosses the vehicles 1, 2, . . . , 30 traveling in the opposite lane L2. In this example, it is assumed that a passenger of the vehicle 2 possesses a client apparatus $20b_1$ and a passenger of the vehicle 30 is in possession of a client apparatus $20b_2$. The server apparatus 10 determines that at the position P2, the vehicles B and 2 have crossed each other. The server apparatus 10 transmits content data to the client apparatus $20b_1$ possessed by the passenger of the vehicle 2. That is, the server apparatus 10 reads the sale information connected to the identification data "AA0" and transmits the retrieved sale information to the client apparatus $20b_1$. In turn, the client apparatus $20b_1$ reproduces the received sale information.

Likewise, at the time of the vehicles B and 30 crossing each other at the position P30, the sale information is transmitted to the vehicle 30. The vehicle 30 then reproduces the received sale information. In this manner, advertising may be carried out effectively for users in the proximity of the retail store 40. The sale information may include link information for linkage to map data showing the way to the retail store 40. If there exist client apparatuses on board vehicles other than the vehicles 2 and 30, the sale information may also be transmitted to these client apparatuses.

The personal computer installed in the retail store 40 may be the client apparatus 20a. In this case, the client apparatus 20a remains stationary, and the client apparatus 20b alone serves as the communication terminal on board a mobile object. The personal computer of the retail store 40 uploads the identification data, GPS data, and content data (e.g., sale information) to the server apparatus 10.

As the vehicle 2 is traveling towards the retail store 40, the server apparatus 10 determines that the client apparatuses 20a and 20b are coming into close proximity to each other. The server apparatus 10 transmits to the vehicle 2 the sale information uploaded by the personal computer (client apparatus 20a) of the retail store 40. Likewise, when the vehicle 30 traveling towards the retail store 40 comes into close proximity to the latter, the server apparatus 10 transmits the sale information to the vehicle 30.

The sale information may be supplemented with distance information. The sale information may be transmitted to the client apparatuses located within a range defined by the distance information attached to the sale information. For example, the distance information may be set to denote a few kilometers. The sale information may be transmitted to any client apparatus that may come within the range of a few kilometers of the retail store 40. When the sale information is transmitted to client apparatuses at a predetermined distance from the retail store 40, the users of these client apparatuses can take their time in deciding whether or not to visit the retail store 40.

The content data may also be supplemented with timing data designating the timing for transmitting the data in question. For example, the timing data may denote the timing of the client apparatuses 20a and 20b crossing each other, or the timing of the elapse of a predetermined time period after the client apparatuses 20a and 20b have crossed each other. The timing data is not limited to time information; the timing data may also be the above-described distance information. When the server apparatus transmits the content data, the timing of the client apparatuses crossing each other is not limitative of when the server apparatus can transmit the data; the timing for transmitting the content data may be determined as desired.

3. Variations

It should be understood that the disclosure is not limited to the above-described embodiment and applications, and that various variations may be made. Variations of the disclosure will now be explained.

The GPS module may include a gyro sensor or the like. In addition to the position information, the GPS module may detect the traveling direction.

Whereas the embodiment and applications above were shown to include the client apparatuses 20a and 20b, there may be provided three or more client apparatuses. For example, when the client apparatuses 20a, 20b and 20c come into close proximity to one another, the server apparatus may transmit content data to the three client apparatuses. The client apparatuses may each be mounted on a mobile object such as a vehicle.

The above embodiment, applications and variations of this disclosure may be structured and handled in suitable combinations so far as they are not technically inconsistent with one another. The order in which the processes explained above as examples were shown to proceed may be modified or changed as desired as long as there occurs no technical inconsistency in the flow of the processing.

In addition to the form of apparatuses, the present disclosure may be implemented as a method, a program, or a recording medium that records the program. Furthermore, this disclosure may also be applied to a so-called cloud system in which the processes discussed above as examples may be performed by a plurality of apparatuses on a distributed basis. Also, this disclosure may be an apparatus that performs at least part of the above-described processes.

The present disclosure may also have following configurations.

(1) A communication system including:
a first apparatus and a second apparatus being communication terminals at least one of which resides on a mobile object; and
a server apparatus,
in which the server apparatus includes
a determination block configured to determine whether the first and the second apparatuses are in close proximity to each other based on position data of the first apparatus and on position data of the second apparatus, and
a communication block configured such that if the determination block determines that the first and the second apparatuses are in close proximity to each other, the communication block transmits preinstalled content data to at least one of the first and the second apparatuses.

(2) The communication system as described in paragraph (1) above, in which the communication block receives the position data transmitted from the first apparatus as well as the position data transmitted from the second apparatus.

(3) The communication system as described in paragraph (1) or (2) above, further including
a content providing apparatus configured to provide the content data to the server apparatus.

(4) The communication system as described in paragraph (1) or (2) above, in which the content data is provided by at least one of the first and the second apparatuses.

(5) The communication system as described in any one of paragraphs (1) through (4) above,
in which the first and the second apparatuses are mobile objects, and
the determination block determines whether the first and the second apparatuses pass each other.

(6) The communication system as described in paragraph (5) above, in which, if the determination block determines that the first and the second apparatuses pass each other at a predetermined timing, the communication block transmits the content data in a manner asynchronous with the predetermined timing.

(7) The communication system as described in any one of paragraphs (1) through (6) above, in which the content data is associated with data about the timing at which the content data is transmitted.

(8) A server apparatus including:
a determination block configured to determine whether a first apparatus and a second apparatus are in close proximity to each other based on position data of the first apparatus and on position data of the second apparatus; and
a communication block configured such that if the determination block determines that the first and the second apparatuses are in close proximity to each other, the communication block transmits preinstalled content data to at least one of the first and the second apparatuses.

(9) A communication method, in a communication system, including:
determining whether a first apparatus and a second apparatus are in close proximity to each other based on position data of the first apparatus and on position data of the second apparatus; and
if it is determined that the first and the second apparatuses are in close proximity to each other, then transmitting content data preinstalled in a server apparatus to at least one of the first and the second apparatuses.

The present disclosure contains subject matter related to that disclosed in Japanese Priority Patent Application JP 2011-285727 filed in the Japan Patent Office on Dec. 27, 2011, the entire content of which is hereby incorporated by reference.

What is claimed is:

1. A communication system comprising:
   a communication terminal and another communication terminal; and
   a server apparatus,
   wherein the server apparatus includes circuitry configured to
   receive position data of the communication terminal and position data of the another communication terminal,
   determine at least one of a speed of movement and a direction of movement of at least one of the communication terminal and the another communication terminal,
   determine whether the communication terminal and the another communication terminal are within a predetermined distance of each other and pass each other based on the position data of the communication terminal, the position data of the another communication terminal, and said at least one of the speed of the movement and the direction of the movement, and
   transmit, if it is determined that the communication terminal and the another communication terminal are within the predetermined distance of each other and pass each other, preinstalled content data to at least one of the communication terminal and the another communication terminal.

2. The communication system according to claim 1, wherein the circuitry of the server apparatus is configured to receive the position data transmitted from the communication terminal as well as the position data transmitted from the another communication terminal.

3. The communication system according to claim 1, further comprising a content providing apparatus including circuitry configured to provide the content data to the server apparatus.

4. The communication system according to claim 1, wherein the content data is provided by at least one of the communication terminal and the another communication terminal.

5. The communication system according to claim 1, wherein the communication terminal and the another communication terminal are mobile objects.

6. The communication system according to claim 5, wherein, if it is determined that the communication terminal and the another communication terminal pass each other at a predetermined timing, the circuitry of the server apparatus is configured to transmit the content data in a manner asynchronous with the predetermined timing.

7. The communication system according to claim 1, wherein the content data is associated with data about the timing at which the content data is transmitted.

8. A communication method performed using a communication system comprising a communication terminal, another communication terminal, and a server apparatus including circuitry, the method comprising:
   receiving, using the circuitry, position data of the communication terminal and position data of the another communication terminal,
   determining, using the circuitry, at least one of a speed of movement and a direction of movement of at least one of the communication terminal and the another communication terminal,
   determining, using the circuitry, whether the communication terminal and the another communication terminal are within a predetermined distance of each other and pass each other based on the position data of the communication terminal, the position data of the another communication terminal, and said at least one of the speed of the movement and the direction of the movement, and
   transmitting, using the circuitry, if it is determined that the communication terminal and the another communication terminal are within the predetermined distance of each other and pass each other, preinstalled content data to at least one of the communication terminal and the another communication terminal.

* * * * *